United States Patent
Bryan

[11] Patent Number: 6,151,153
[45] Date of Patent: Nov. 21, 2000

[54] MODULATOR TRANSFER PROCESS AND ASSEMBLY

[75] Inventor: Michael A. Bryan, Los Gatos, Calif.

[73] Assignee: Photon Dynamics, Inc., San Jose, Calif.

[21] Appl. No.: 09/098,193

[22] Filed: Jun. 16, 1998

[51] Int. Cl.$^7$ ........................................... G02F 1/03
[52] U.S. Cl. ..................... 359/245; 359/253; 156/99; 349/187; 349/191; 349/192
[58] Field of Search .................... 349/187, 191, 349/192; 359/245, 253; 156/99

[56] References Cited

U.S. PATENT DOCUMENTS

| H868 | 1/1991 | Daly | 359/257 |
|---|---|---|---|
| 2,467,325 | 4/1949 | Mason | 359/254 |
| 4,802,741 | 2/1989 | Kaukeinen | 359/254 |
| 4,854,678 | 8/1989 | Kitano et al. | 359/254 |
| 4,993,811 | 2/1991 | Blazey et al. | 359/254 |
| 5,083,221 | 1/1992 | Toyoda et al. | 359/245 |
| 5,122,852 | 6/1992 | Chan et al. | 357/30 |
| 5,144,471 | 9/1992 | Takanashi et al. | 359/245 |
| 5,459,410 | 10/1995 | Henley | 324/770 |
| 5,517,348 | 5/1996 | Lebby | 359/254 |
| 5,528,414 | 6/1996 | Oakley | 359/257 |
| 5,631,107 | 5/1997 | Tarumi et al. | 430/1 |
| 5,825,526 | 10/1998 | Bommarito et al. | 359/265 |
| 5,858,624 | 1/1999 | Chou et al. | 430/371 |
| 5,897,727 | 4/1999 | Staral et al. | 156/99 |

FOREIGN PATENT DOCUMENTS

| 3-168613 | 7/1991 | Japan . |
|---|---|---|
| 3-224782 | 10/1991 | Japan . |
| 6-011675 | 1/1994 | Japan . |
| 8-278491 | 10/1996 | Japan . |
| 9-178933 | 7/1997 | Japan . |

*Primary Examiner*—Georgia Epps
*Assistant Examiner*—Evelyn A. Lester
*Attorney, Agent, or Firm*—Townsend and Townsend and Crew, LLP

[57] ABSTRACT

A technique for fabricating an electro-optic modulator material 1009 onto a transfer substrate 1001. The technique includes a method, which provides a first transfer substrate 1001. The method includes a step of forming an electro-optic material 1009 onto a surface of the first transfer substrate 1001 to attach the electro-optic material 1009 to the first transfer substrate 1001. A step of applying or forming a second transfer substrate 1008 overlying the electro-optic material 1009 is included. The second transfer substrate 1008 is attached using an adhesive to the electro-optic material at lower strength than the attachment of the first transfer substrate to the electro-optic material. To use the electro-optic material, a step of removing 1017 the second transfer substrate 1008 from the electro-optic modulator material 1009, which leaves the electro-optic material substantially affixed to the first transfer material, is also included. These steps provide for an easy technique for forming an electro-optic material 1009 on a transfer substrate 1001.

26 Claims, 8 Drawing Sheets

Fig. 13
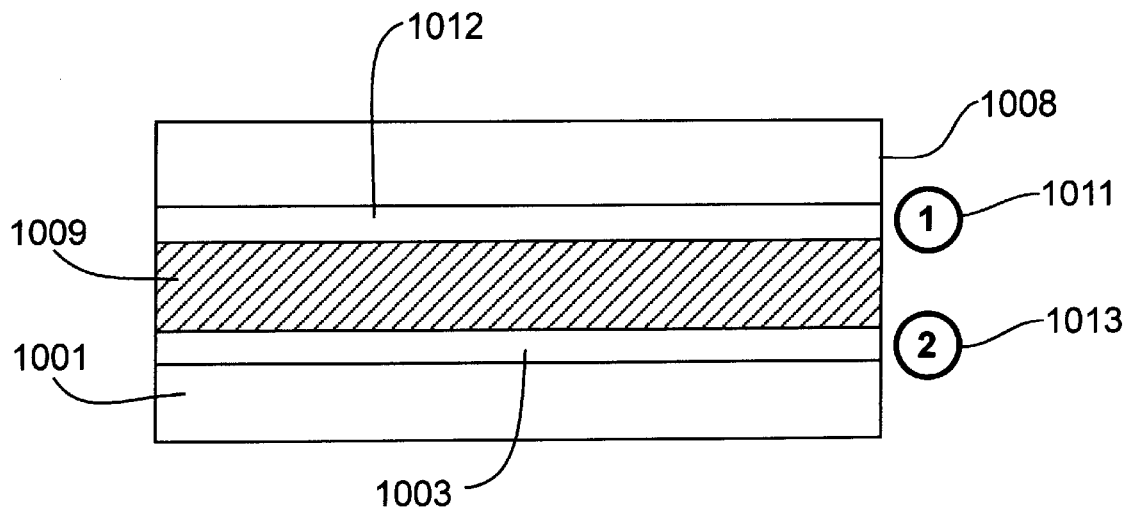
Fig. 14
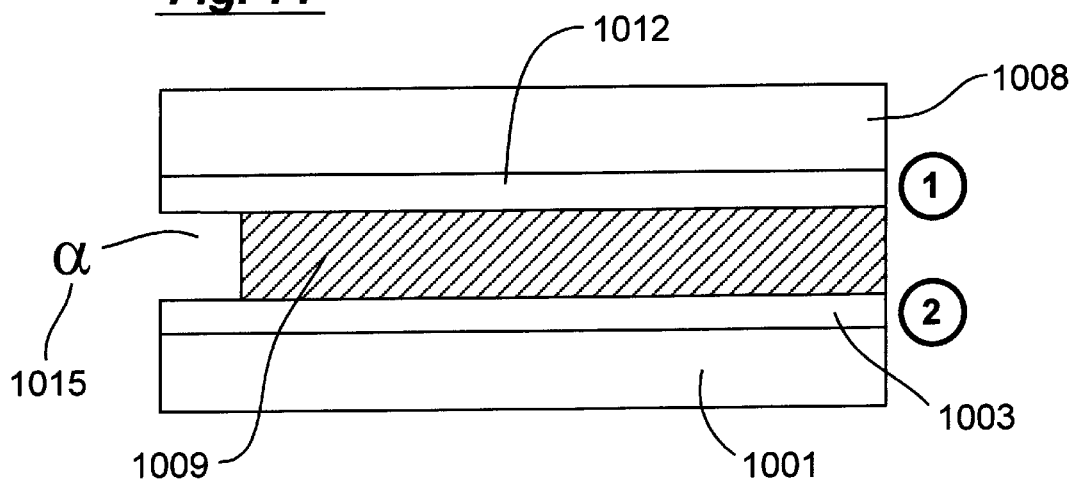
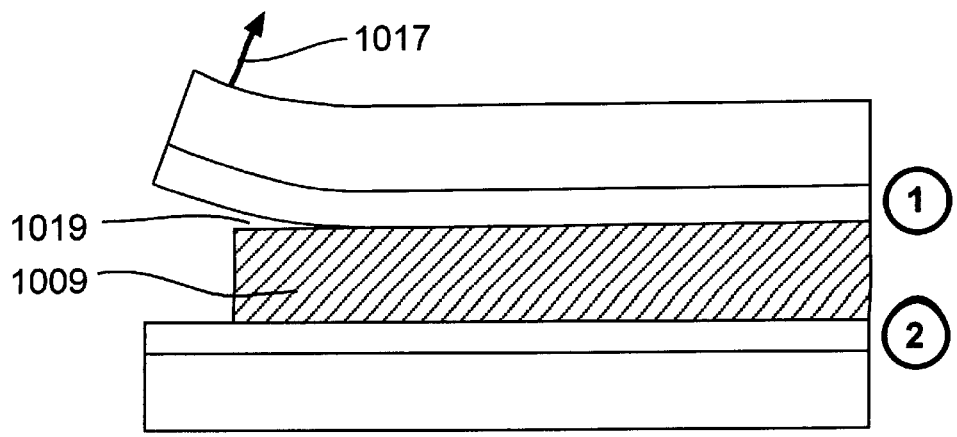
Fig. 15

MODULATOR TRANSFER PROCESS AND ASSEMBLY

CROSS-REFERENCE TO RELATED APPLICATIONS

This present application is generally related to U.S. Ser. No. 09/089,192 (Attorney Docket No. 14116-56) filed on the same date as this present application, commonly assigned, and hereby incorporated by reference for all purposes.

BACKGROUND OF THE INVENTION

This present invention relates to techniques for fabricating flat panel displays. More particularly, the invention is illustrated in an example related to the manufacture of an electro-optical element for use in, for example, inspecting flat panel displays, e.g., liquid crystal displays ("LCDs"), active matrix liquid crystal displays ("AMLCDs"), plasma displays, or the like. But it will be recognized that the invention also can be applied to the manufacture of almost any type electro-optical modulator material for a variety of applications.

The use of a flat panel display such as an active matrix liquid crystal display or the like continues to grow rapidly. For example, consumer items such as a pocket television, a notebook computer, an engineering work-station, a high-definition television, and others, use such a display. Based upon the continued demand for this display, industry has made massive capital investments in creating state-of-art manufacturing lines.

These state-of-art manufacturing lines, however, still rely in most part upon human test operators for the final test and inspection of these flat panel displays. The test operator performs a visual inspection of each display for defects in order to accept or reject the display. The quality or completeness of the inspection is dependent on the test operator, who has been trained using limited samples of displays that have defects and characterized as either pass or fail. The inspection results are highly subjective and prone to error, and cannot be used effectively and efficiently to monitor, control, and improve the quality of the various manufacturing processes.

Effective process monitoring and control of flat panel display production have been made possible through quantitative inspection methods by way of automatic inspection machines. An example of one of the first pioneering automatic inspection machines was developed by Photon Dynamics, Inc. ("PDI") in 1992, assignee of the present application. This first automatic inspection machine is pioneering, since a high quality inspection of flat panel displays could be performed using machines, rather than human test operators. This high quality inspection was performed on flat panel displays having completed thin film transistor components fabricated thereon.

The high quality inspection performed by machines occurs, in part, by way of conventional electro-optical elements. The electro-optical element is placed adjacent to, for example, an active matrix liquid crystal display substrate to be tested. When an electric field is impressed via the active matrix liquid crystal display upon the electro-optical element, optical properties of the element change. The change in optical properties is a microscopic optical change in the electro-optical element itself. Cameras read the change in the electro-optical element to identify defects in the active matrix liquid crystal display substrate being tested.

Although extremely useful, the conventional electro-optical element is generally difficult to manufacture. In particular, a relative complex sequence of manufacturing steps is generally performed to fabricate the electro-optical element. This complex sequence of steps generally causes lower yields and longer turn-around times, which often lead to higher costs associated with manufacturing the element. Moreover, the conventional electro-optical element is extremely delicate and prone to damage, e.g., scratches, gouges. Damage to the element can occur even after the manufacturing process during use in the automated inspection process. Techniques have generally not been developed to easily repair the damaged electro-optical element. Accordingly, electro-optical elements are often replaced, which tends to further increase costs associated with the automated inspection process.

From the above, it can be seen that a technique for manufacturing or repairing electro-optical elements that is easy, cost effective, and reliable is often desirable.

SUMMARY OF THE INVENTION

According to the present invention, a technique including a method and device for manufacturing electro-optic elements or modulator materials is provided. These modulator materials can be used for the manufacture of an inspection apparatus for displays, e.g., flat panel displays such as LCDs, AMLCDs, plasma displays. Additionally, the modulator materials can be used to manufacture the displays themselves. More particularly, the invention provides a technique for manufacturing a transfer device for an electro-optic modulator element. Furthermore, the present invention provides a technique for repairing electro-optic modulator materials using an efficient and cost effective technique.

In a specific embodiment, the present invention provides a method for fabricating an electro-optic modulator material onto a transfer substrate. The method includes providing a first transfer substrate, which has a top surface. The method then includes a step of forming an electro-optic material onto the top surface of the first transfer substrate, which attaches the electro-optic material to the first transfer substrate. A step of applying or forming a second transfer substrate overlying the electro-optic material is included. The second transfer substrate can be attached using an adhesive applied to the electro-optic material. This attachment has a lower strength than the attachment of the first transfer substrate to the electro-optic material. To use the electro-optic material, a step of removing the second transfer substrate from the electro-optic material, which leaves the electro-optic material substantially affixed to the first transfer material, is also included. These steps provide for an easy technique for forming an electro-optic material on a transfer substrate.

In an alternative embodiment, the present invention provides a method of repairing an electro-optic element using, for example, a transfer substrate. The repair method includes providing an electro-optic assembly, which has a substrate, a first electro-optic modulator material defined on the substrate, and a first electrode overlying the modulator material. This electro-optic assembly has a defect on either the electrode or the modulator material. The defect can be a gouge, a scratch, or other imperfections, which might be found in an electro-optic modulator assembly. The defect is eliminated by removing the first electrode and the first modulator material from the substrate to provide an essentially defect free substrate structure, which may or may not include an electrode defined thereon. The assembly is rebuilt by affixing a second electro-optic modulator material having an overlying transfer substrate onto the substrate. The transfer substrate is removed and a protective layer is affixed to the defect free modulator material. These steps are easy to perform and provide a repair technique, which can occur in the field or customer site.

Numerous advantages are achieved by way of the present invention over pre-existing techniques. These advantages include, among others, greater planarity and uniformity of completed electro-optic elements. Additionally, the present invention provides for easier manufacturing using few sequences of steps in preferred embodiments. Furthermore, the present invention provides for electro-optic elements having lower manufacturing costs than pre-existing techniques in most embodiments. Moreover, the electro-optic elements by way of the easier manufacturing technique can be made with higher quality than pre-existing techniques in some embodiments. These and other benefits are further described below.

The invention will be better understood by reference to the following detailed description in connection with the accompanying drawings.

BRIEF DESCRIPTION OF THE DRAWINGS

FIGS. 10–15 are simplified cross-sectional view diagrams of an electro-optic element according to an alternative embodiment of the present invention.

DESCRIPTION OF SPECIFIC EMBODIMENTS

The present invention provides a technique including a method and apparatus for manufacturing electro-optic elements or modulator materials. These modulator materials can be used for the manufacture of an inspection apparatus for displays, e.g., flat panel displays such as LCDs, AMLCDs, and plasma displays. Additionally, the modulator materials can be used to manufacture the displays themselves.

1. Present Electro-Optic Modulator Element

Figure 1:
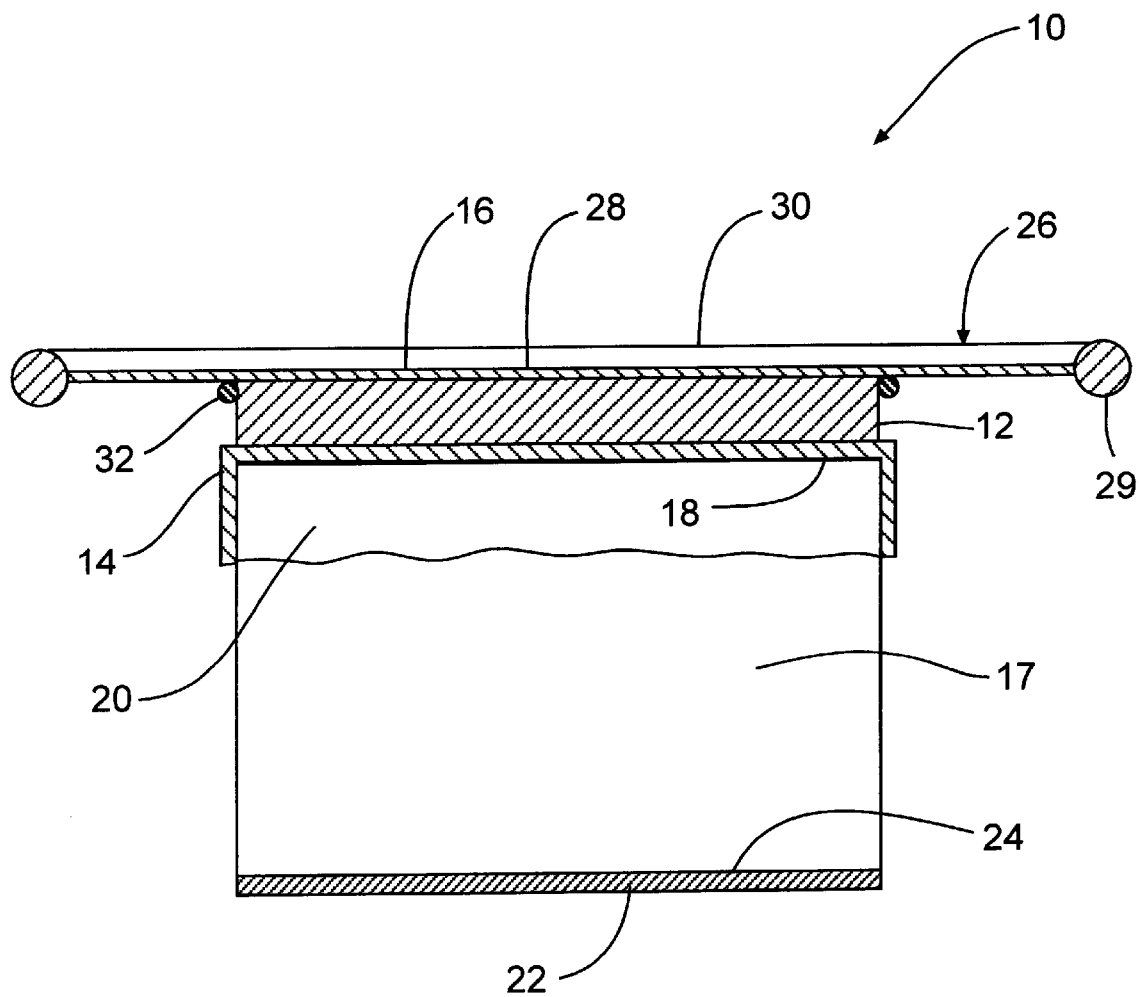
FIG. 1 is a simplified cross-sectional view diagram of an electro-optic element according to the present invention.

FIG. 1 is a simplified cross-sectional view diagram of an electro-optical element 10 according to the present invention. This diagram is merely an illustration and should not limit the scope of the claims herein. As shown, the electro-optical element 10 is an assembly of various elements and layers. These layers generally include an electro-optical modulator material 12 disposed upon transparent electrode 14. Electrode 14 is defined on a substrate 17, which is often termed a cube. Electrode 14 overlies a top surface 18 of the substrate and also overlies portions of four edges 20 of the substrate. Substrate 17 includes an anti-reflective coating 22 (e.g. a dielectric anti-reflective stack of layers) defined overlying a bottom surface 24. A pellicle assembly 26, which includes a reflective material 16, is defined overlying the modulator material 12.

The electro-optical modulator material 12 is often made of liquid crystal containing sheets called Nematic Curvilinear Aligned Phase material, commonly termed NCAP or polymer dispersed liquid crystal (PDLC). Light transmission changes in accordance with a magnitude of an electric field impressed across the liquid crystal material. Alternatively, liquid crystals in a polymer matrix or binder which appear transparent or non-transparent may be used. Alternatively, materials that can be used exploiting the Pockel's effect, in which the magnitude of polarization of reflected light changes depend upon a strength of electric field applied or impressed thereon, may also be used. Of course, the type of electro-element or modulator material used depends upon the application.

Transparent electrode 14 can be made from a variety of materials. These materials include, among others, indium tin oxide (ITO). Other types of materials that are relatively transparent and conductive can also be used. Of course, the type of material used depends upon the application.

The present electro-optical element includes an interface region, between the modulator material and the electrode, that is thinner and more planar than pre-existing structures. In particular, an interface between the electro-optical modulator material and the electrode is preferably a uniformly thin film of adhesive. Specifically, the adhesive layer should be flatter than 3 microns across the entire surface. Further the adhesive should have a thickness of less than about 0.5 microns to 1.0 microns. An example of this adhesive is an epoxy, a cyanoacrylate, a silicone based RTV, an ultraviolet light ("UV") curable epoxy. A product sold under the name of UV.10 by Master Bond can be used, but there can be others. Accordingly, the present invention provides an improved structure, which has greater quality than pre-existing techniques. The choice depends on the desired viscosity, thixotropy, and solvent like qualities desired.

The pellicle assembly 26 is generally made of a support structure 29 having a film of plastic 30 disposed thereon. The support structure 29 can be an annular ring structure such as an aluminum ring or the like. Pellicle assembly 26 provides support for the reflective layer 16 and provides protection to the electro-optical modulator material.

The plastic film can be made of a variety of materials, but is preferably Mylar. The plastic film often includes an overlying reflective layer 16. Preferably, the reflective layer is defined overlying a surface, which faces against the electro-optical modulator material. This reflective layer 16 facing the electro-optical modulator material is protected by the overlying film of plastic 30 such as Mylar and the like. A thin film or bead 32 of adhesive can be applied to a periphery of the electro-optical material to seal it to reflective layer 16. Accordingly, the present pellicle assembly is more durable than those made by pre-existing techniques.

Substrate 17 includes the overlying electrode layer 14 such as indium tin oxide or the like. Electrode layer 14 is defined overlying the top surface of the substrate, which is finished, as well as portions of the side surfaces or edges, which are not finished. Preferably, ITO layer is disposed in a single continuous layer overlying the top surface and edges, but it does not cover bottom edges or the bottom of the substrate. The ITO layer can be applied to the substrate via sputtering and masking techniques, and other well known methods. The bottom of the substrate typically includes an anti-reflective layer 22. As merely an example, the substrate is a cube (or other cylindrically-shaped solid) of BK-7 glass from Tusan Optical Research Corporation ("TORC").

Although the above descriptions are described in terms of a specific embodiment, other variations, alternatives, and modifications can be used. For instance, although the electrode layer in the above embodiment is described as indium tin oxide, other materials can be used. Additionally, the substrate described is one manufactured by TORC, other substrates such as those manufactured by any of a variety of manufacturers such as Scott and others can be used. The above electro-optical element can be used in a variety of applications including, for example, the test equipment shown in the FIG. below.

Figure 2:
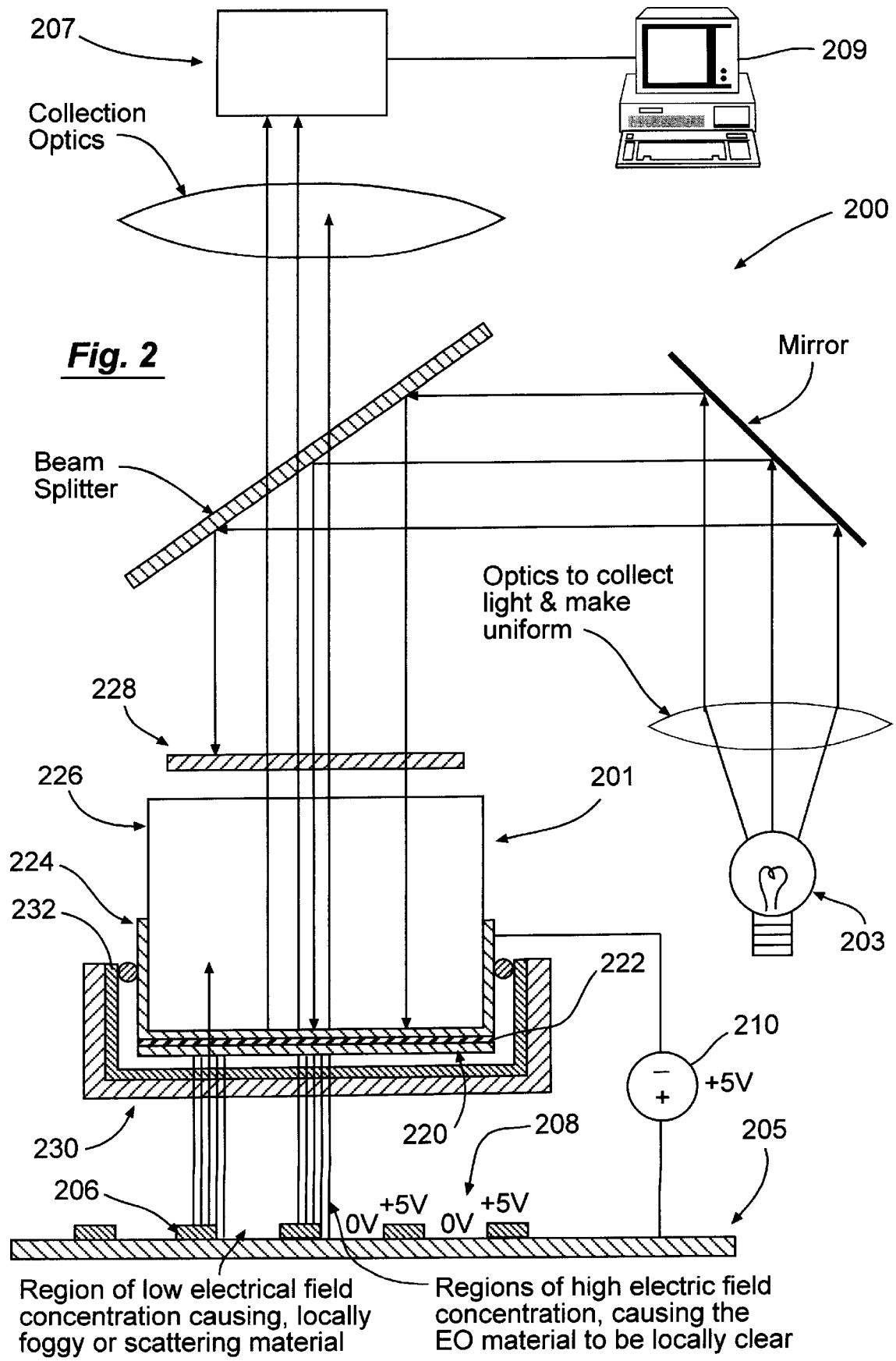
FIG. 2 is a simplified diagram of elements for test equipment using the electro-optic element according to the present invention.

FIG. 2 is a simplified diagram of main elements of test equipment 200 using the electro-optical element 201 according to the present invention. This diagram is merely an illustration and should not limit the scope of the claims herein.

As previously described electro-optical element 201 includes an electro-optical modulator material 220, an adhesive layer 222, an electrode 224, a substrate 226, an anti-reflective coating (ARC) 228, and a pellicle assembly 230. In the present embodiment, a mirror or reflective layer 232 is disposed on the inside surface of the pellicle assembly 230. In one embodiment, mirror 232 is a thin film formed using a sputtering process or evaporatively deposited and is composed of oxides such as zirconium oxide, aluminium oxide or chromium oxide. This arrangement provides enhanced durability of the mirror 232. In alternative embodiments, mirror 232 may be disposed on the outside surface of the pellicle assembly 230.

The test equipment 200 includes a light source 203 or sources, which irradiate light to a surface of, for example, an active matrix liquid crystal display 205. The active matrix liquid crystal display 205 includes pixel elements 206 disposed between inactive regions 208. A voltage 210 is applied between the active matrix liquid crystal display 205 and the electro-optical element assembly 201. Voltage 210 is typically biased with a DC offset such at the electro-optical modulator material 220 is within a "high gain" region. In other words, a DC bias is imposed such that a small additional change in voltage impressed by voltage 210 provides a large change in modulation characteristics of electro-optical modulator material 220.

In operation, light transmits through portions of the electro-optical element assembly, and defects can be detected by observing changes in the reflected or transmitted light. Thus for example, in areas where a normal pixel is located, a localized voltage potential is impressed causing the electro-optical modulator material to be locally translucent. Further in areas where no voltage potential is impressed, the electro-optical modulator material remains relative opaque. In the case where the material is locally translucent, light from light source 203 is reflected from mirror 232 and captured by camera 207. In other areas, little light is reflected.

Observing generally takes place using camera 207, such as "Thompson" brand charge coupled device ("CCD") camera or the like. A monitor 209 from a computer system coupled to an image processor is also typically included for inspection purposes. In most cases, the electro-optical element assembly is disposed against or close to the surface of the active matrix liquid crystal display to facilitate inspection. An example of this test equipment is described in U.S. Pat. No. 4,983,911, in the name of Francois J. Henley, commonly assigned, and hereby incorporated by reference for all purposes.

Figure 3:
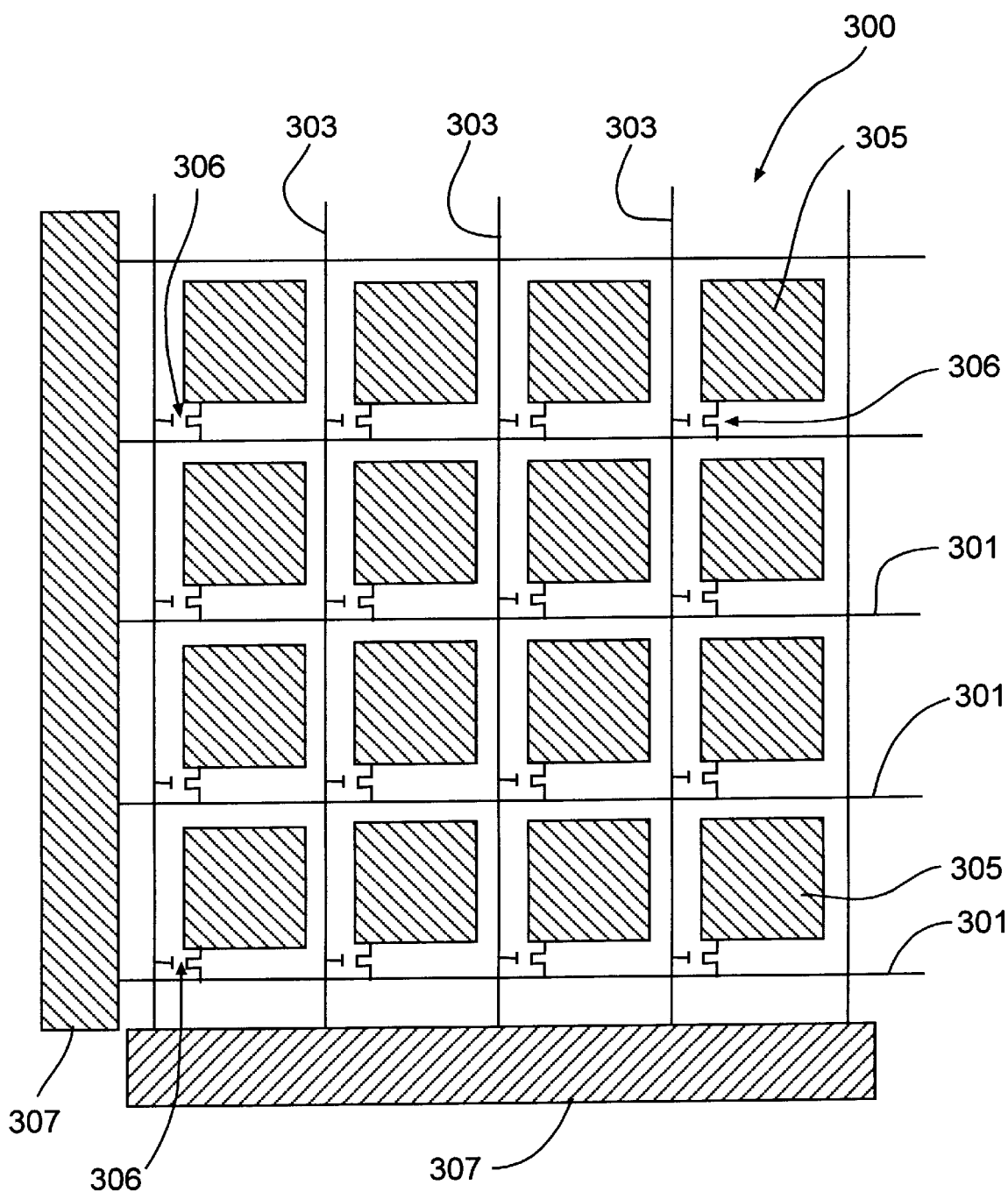
FIG. 3 is an expanded diagram of elements of an active matrix liquid crystal display substrate.

FIG. 3 is an expanded diagram of simplified elements of an active matrix liquid crystal display substrate 300, such as the one noted above. This diagram is merely an illustration and should not limit the scope of the claims herein. Active matrix liquid crystal display substrate 300 is one commonly used in liquid crystal display panels. The display 300 is constructed of several source wires 301 to generate flow of data signals, and several gate wires 303 to allow flow of scan signals formed on a substrate in an array state. Pixel element electrodes 305 are formed in between these wires, and each pixel element electrode is connected to a source wire and a gate wire via a switching element which is a thin film transistor 306. A shorting bar 307 connects to source wiring and connects to gate wiring. This shorting bar 307 is often removed after manufacturing the liquid crystal display substrate. Liquid crystals are inserted between the active matrix liquid crystal display and a transparent substrate to form the liquid crystal display panel. Of course, there are other types of displays and elements which can be observed by way of the present electro-optical modulator element.

2. Present Fabrication Techniques

In a specific embodiment, the invention provides a technique for manufacturing a modulator material for an electro-optical display or inspection of a flat panel display or the like using a transferring technique. The technique may be briefly outlined as follows:

1. Provide a transfer material having a layer of electro-optical modulator material formed thereon;
2. Provide a substrate having an overlying first electrode layer formed thereon;
3. Clean surface of the electrode layer on the substrate to remove any oils or particles therefrom;
4. Dispense adhesive material on the first electrode layer;
5. Place the layer of electro-optical modulator material (transfer material facing away from the substrate) on the first electrode layer overlying the substrate;
6. Cure or dry adhesive;
7. Remove the transfer material from the layer of electro-optical material while keeping the electro-optical material intact and affixed to the first electrode layer;
8. Dispose a pellicle/reflector assembly adjacent the surface of the electro-optical modulator material; and
9. Perform remaining fabrication steps, as necessary.

As shown, the technique generally provides a sequence of steps that forms an electro-optical modulator material on a substrate. The sequence of steps uses an electro-optical modulator material formed on a transfer material, which is later discarded. By way of the transfer material, the electro-optical material is easily affixed to a substrate to form the electro-optical assembly, without a possibility of damage to the electro-optical material or electrodes. The above sequence of steps is merely illustrative, and should not limit the scope of the claims herein. One of ordinary skill in the art would recognize other variations, modifications, and alternatives. Details with regard to the present invention are described throughout the present specification and more particularly in the FIGS. below.

FIGS. 4–9 are simplified cross-sectional view diagrams of an electro-optical element being manufactured according to the present invention. These diagrams are merely illustrations and should not limit the scope of the claims herein.

Figure 4:
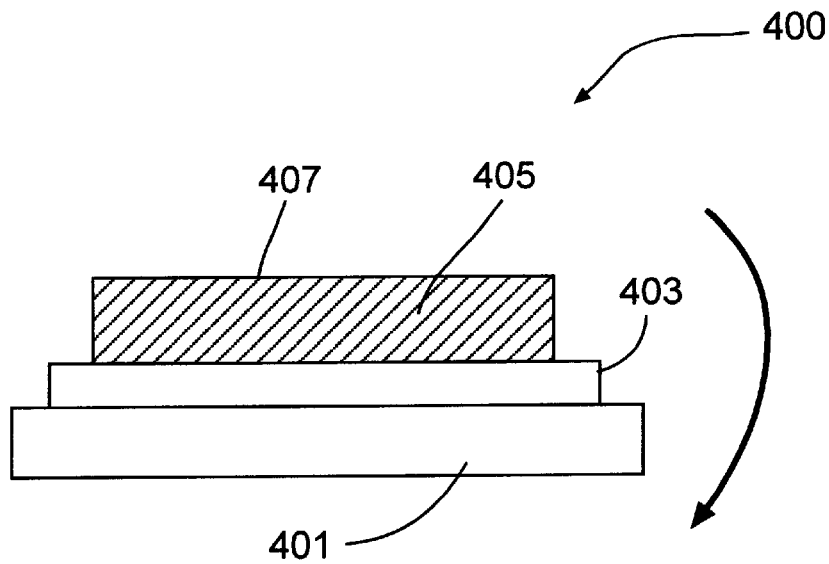
FIGS. 4–9 are simplified cross-sectional view diagrams of an electro-optic element being manufactured according to the present invention.

The process begins with a transfer assembly 400 as illustrated by FIG. 4, for example. The transfer assembly 400 includes a transfer substrate 401, an intermediary sheet 403, and a film of electro-optical modulator material 405 defined thereon. The transfer substrate 401 can be any relatively firm and rigid material capable of supporting the electro-optical modulator material. The substrate generally has a certain amount of flexibility, however. In most embodiments, the transfer substrate has a flexibility similar to a regular "business card." The substrate is also generally abrasion resistant and capable of protecting the electro-optical modulator material. An example of this transfer substrate is a film of plastic material, such as Mylar or the like, or a composite, but can also be others.

In one embodiment, overlying the transfer substrate is an intermediary sheet 403, which defines an interface between the transfer substrate 401 and the electro-optical optical modulator material 405. This sheet has a relatively smooth surface finish to facilitate the transfer process. The sheet also should be durable and capable of temporarily adhering to the electro-optical modulator material 405, but can also easily detach itself from the electro-optical modulator material. An example of the intermediary sheet or film is a metal, such as indium tin oxide, but can also be other materials, e.g., plastics, composites, multi-film structures. In another embodiment, intermediary sheet 403 is not necessary as electro-optical modulator material may be disposed directly upon transfer substrate 401.

The electro-optical modulator material 405 has an upper exposed surface 407. This exposed surface 407 is clean and substantially or completely free from contaminants, e.g., oils, particles. The exposed surface also is relatively planar and smooth. Planarity often ranges from a uniformity value of about 0 microns to about 3 microns across the surface, and is preferably less than about 4 microns RMS, but can also be others. The electro-optical modulator material 405 is often made of liquid crystal containing sheets called Nematic Curvilinear Aligned Phase material, commonly termed NCAP or polymer dispersed liquid crystal (PDLC). Light transmission changes in accordance with a magnitude of an electric field impressed across the liquid crystal material. Alternatively, liquid crystals in a polymer matrix or binder which appear transparent or non-transparent may be used. Alternatively, materials that can be used exploiting the Pockel's effect, in which the magnitude of polarization of reflected light changes depend upon a strength of electric field applied or impressed thereon, may also be used. Of course, the type of electro-element or modulator material used depends upon the application.

In other embodiments, the transfer substrate also includes the intermediary sheet or substrate in a single structure. In these embodiments the combination of the transfer and intermediary sheet(s) or substrate(s) may exhibit the same properties as the transfer substrate and the intermediary sheet individually or the transfer substrate alone. Of course, in other embodiments, additional films and/or layers can be added to facilitate the transfer process of the electro-optical modulator material.

Figure 5:
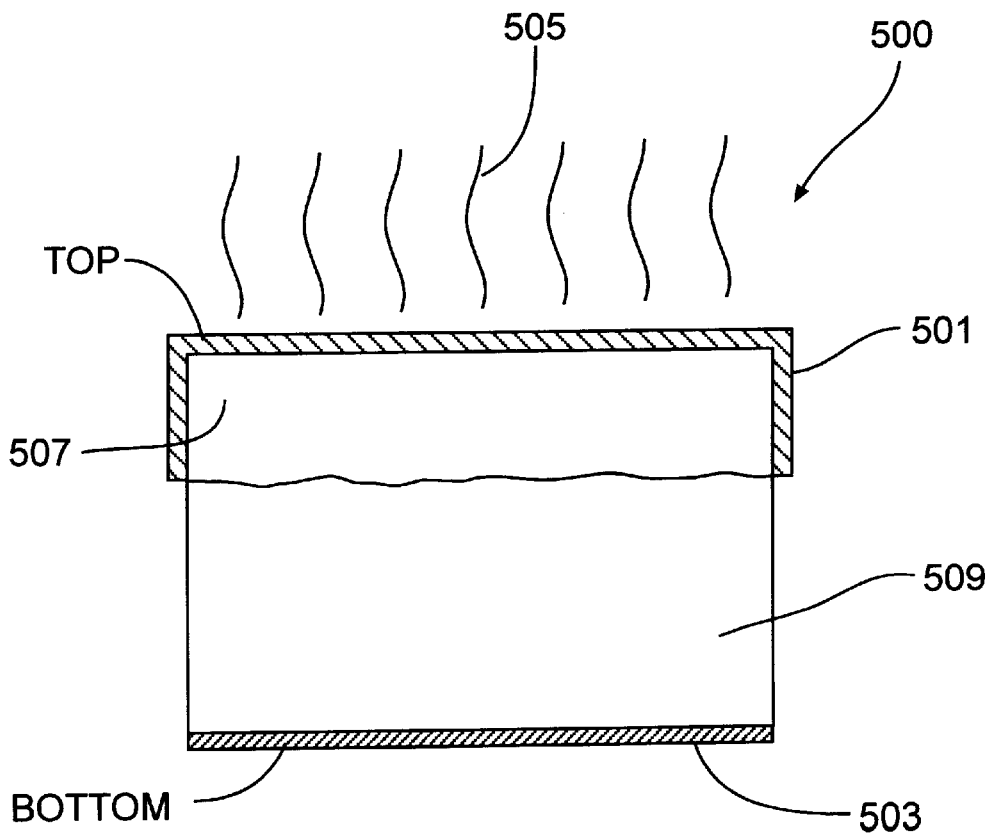

The process also includes providing a substrate or "cube" 500, as shown by FIG. 5. The cube has six sides, which include four non-finished sides and two finished sides, e.g., top and bottom. An example of this cube is made from BK-7 glass from Tusan Optical Research Corporation ("TORC"), but can also be others. Substrate 500 has an overlying electrode layer 501 such as ITO or the like. Electrode layer 501 is defined overlying a top surface of the substrate, as well as portions of the side surfaces or edges 507. Preferably, the indium tin oxide layer is disposed in a single continuous layer overlying the top surface and edges, but it does not cover bottom edges 509 or the bottom of the substrate. The indium tin oxide layer can be applied to the substrate via sputtering and masking techniques, and others.

The indium tin oxide is defined overlying top surfaces and part of the sides of the cube to allow the electric field concentration between the ITO layer and the pixels to be sufficient to change the transmission characteristics of the electro-optical modulator material.

The top surface of the cube is cleaned 505 using solvents to remove contamination such as particles and oils from the top surface. These solvents can include alcohol, acetone, MEK, and others. In some embodiments, a product sold under the trade name of OPTICLEAN™ made by Optical Products, Inc. can be used. This product is dispensed over the top surface as a viscous liquid, which readily absorbs any particles and oils from the top surface. The product then emulsifies into a plastic-like structure similar to "plastic wrap." After emulsification, the structure is pealed off, which also lifts off any oils and particles which embed themselves into the structure, thereby leaving the top surface substantially free from contamination including particles and oils. Of course, the type of cleaning technique may depend upon the application.

Figure 6:
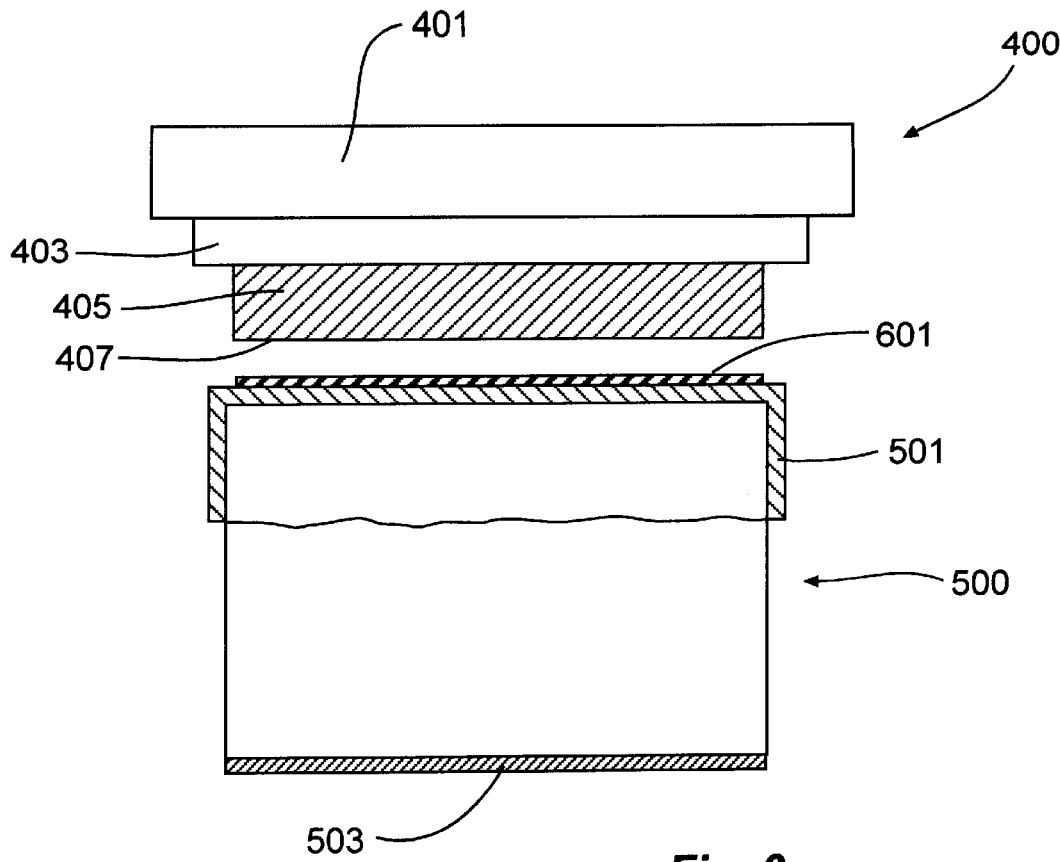

The process undergoes a step of attaching or affixing the electro-optical modulator material 405 onto the cube, as illustrated by FIG. 6. In particular, the top surface 407 of the electro-optical modulator material 405 from the transfer assembly 400 is placed against the surface of the electrode layer 501 defined on the cube 500. Before placing these surfaces against each other, both surfaces are cleaned and/or are substantially free from oils and particulate contamination, as noted above. A layer 601 of adhesive is applied to either one or both of the surfaces before attachment. The adhesive 601 is generally transparent and has desired properties to affix the electro-optical modulator material to the electrode layer. The adhesive is applied uniformly onto one or both of the surfaces. An example of this adhesive is an epoxy, a cyanoacrylate, a silicone based RTV, an ultraviolet light ("UV") curable epoxy. A product sold under the name of UV. 10 by Master Bond can be used, but there can be others.

Figure 7:
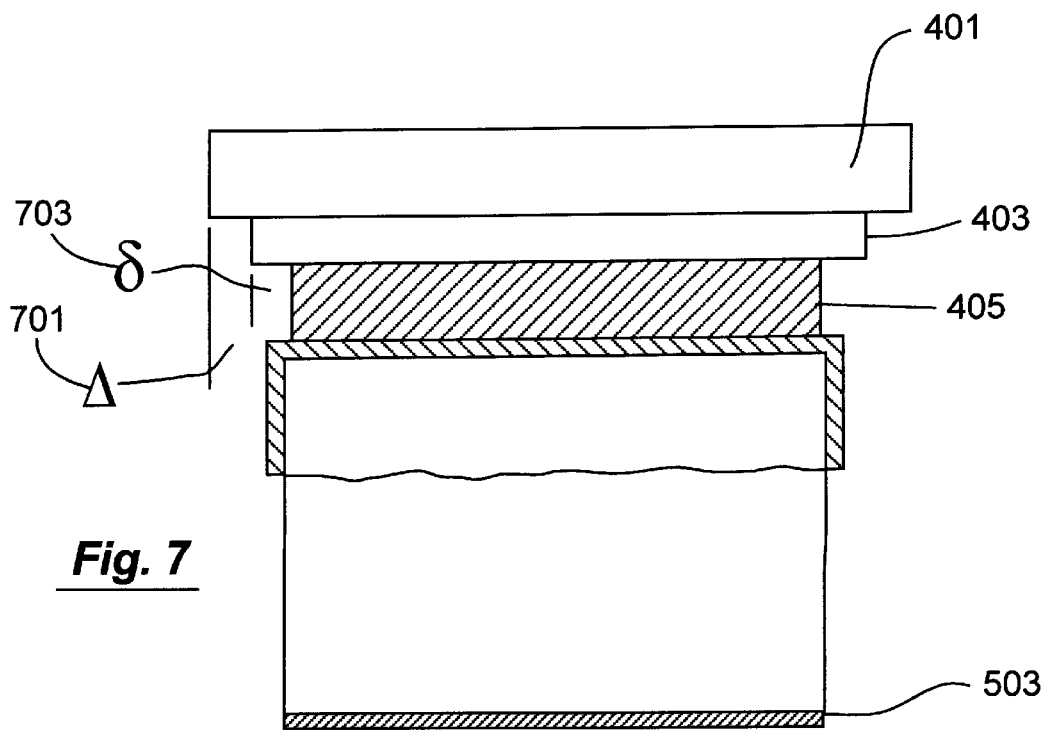

An intermediary structure including the transfer assembly 400 and the cube 500 is illustrated by way of FIG. 7. The electrode layer on the cube is firmly affixed to the electro-optical modulator material in the transfer assembly, as shown. The electrode layer on the cube is attached to the electro-optical modulator material at a much greater force (or pressure) than the force (or pressure) attaching the electro-optical modulator material to the transfer substrate. In particular, the force attaching the modulator material to the electrode layer is about or at least greater than the force attaching the modulator material to the transfer substrate, which facilitates the transfer process. Additionally, before placing the transfer assembly onto the cube assembly, the transfer substrate is selectively made to promote or facilitate the transfer process. In particular, the transfer assembly has an overlying transfer substrate region that extends or protrudes at least a distance ("delta") 701 outside the electro-optical modulator material. The intermediary sheet also has a region that extends or protrudes at least a distance ("δ") 703 outside the electro-optical modulator material.

Figure 8:
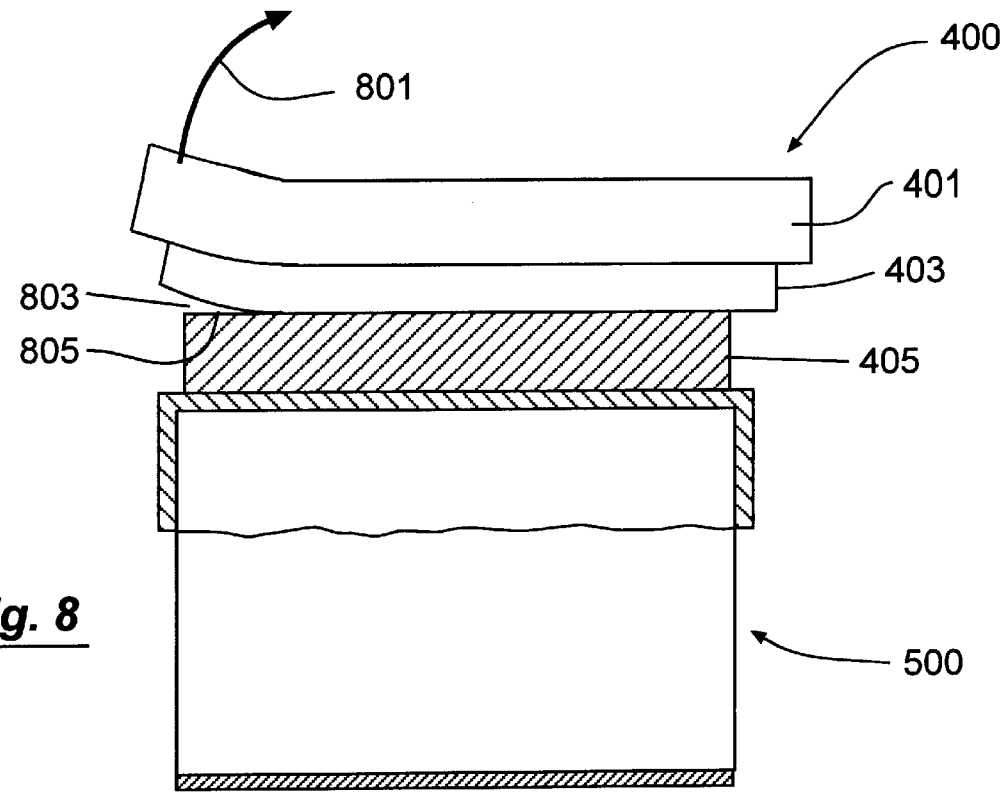

The transfer substrate region extending outside of the electro-optical modulator material can, for example, be mechanically grasped and pulled as shown in FIG. 8. By way of pulling 801 (refer to arrow) the region of the transfer substrate in a direction away from the cube, the transfer substrate is removed or effectively peeled off 803 of the electro-optical modulator material, which removes the transfer substrate off of the electro-optical modulator material. As shown, the electro-optical modulator material remains firmly attached to the electrode layer on the cube and is not damaged by way of the transfer process. The electro-optical modulator material has a surface 805 which is essentially free from defects and is previously protected by the presence of the transfer substrate.

Figure 9:
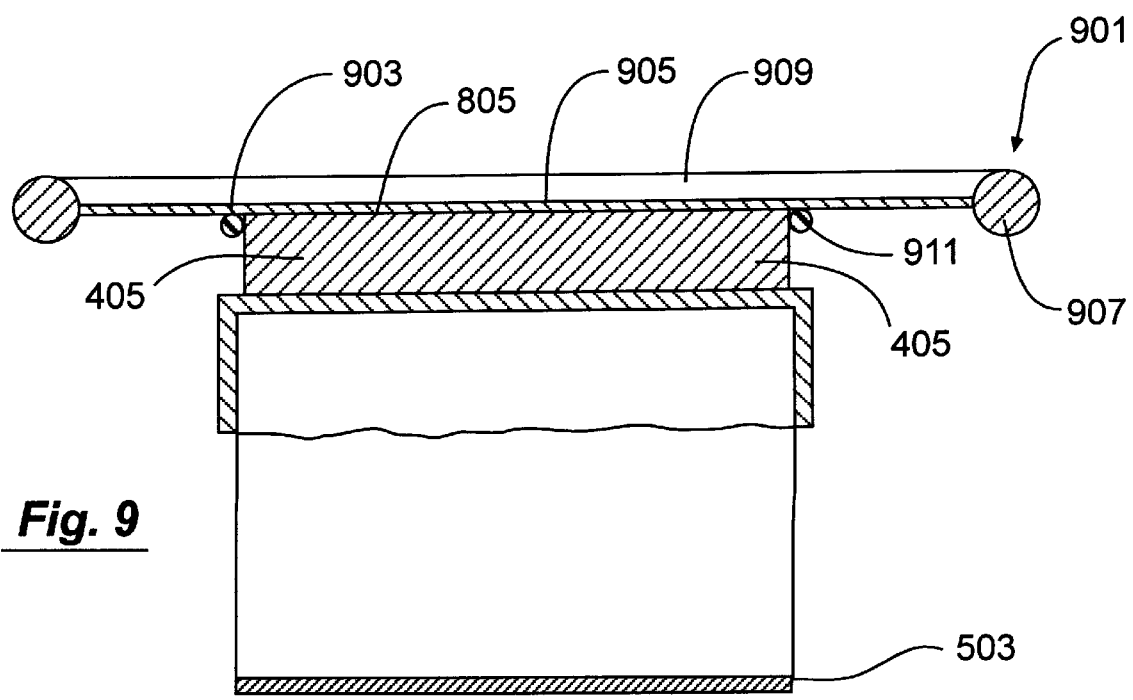

A pellicle assembly 901 is placed overlying surface 805 of the electro-optical modulator material 405, as shown in FIG. 9. Preferably, the pellicle assembly is applied to the electro-optical modulator material immediately after removing the transfer substrate to prevent a possibility of contaminants (e.g., oils, particles) from accumulating or attaching themselves on the exposed modulator material. The pellicle assembly 901 has an reflective layer 903 disposed on an inner surface 905 against surface 805 of the electro-optical modulator material 405. A rigid support structure 907 holds a sheet 909, which supports electrode layer 904. The sheet 909 is often made of a material as thin as possible, usually less than 3.0 microns thick with a dielectric mirror (reflective layer 903). Support structure 907 can be an annular ring assembly to provide a frame like structure to hold sheet 909.

In preferred embodiments, the pellicle assembly 901 is fabricated separately and is affixed to the electro-optical modulator material 405 using an adhesive. In most cases, an adhesive bonds surface 805 of the electro-optical modulator material 405 to a surface of the mirror layer 903. Adhesive can be applied to either or both surfaces. In some embodiments, the adhesive can also be applied to an outside interface of the modulator material on the electrode in a bead-like 911 manner to seal the outer edges of the modulator/electrode assembly. The adhesive is generally transparent when dried and is capable of bonding a metal to the electro-optical modulator material. An example of this adhesive is an epoxy, a cyanoacrylate, a silicone based RTV, an ultraviolet light ("UV") curable epoxy. A product sold under the name of UV.10 by Master Bond can be used, but there can be others.

Although the above embodiments are described in terms of using a transfer substrate having an exposed electro-optic modulator material defined thereon, the modulator material may also have a temporary film or sheet of material defined on the modulator material for storage and/or protection. In particular, a film or sheet of material can be placed overlying the modulator material to define a sandwiched structure, including the modulator material disposed between two films of material, which include the transfer substrate. One sheet or film of material is attached to the modulator material at a greater strength than the other sheet or film of material, which allows for one sheet to be removed leaving the other film substantially intact. Preferably, removal of the one sheet occurs immediately before placing the modulator material onto the electrode layer to prevent a possibility of any contamination from accumulating or attaching themselves on the modulator material. Details with regard to manufacturing the transfer substrate including the electro-optic material are discussed throughout the present specification and most particularly below.

3. Present Transfer Substrate Method

In a specific embodiment, the invention provides a technique for manufacturing a transfer substrate with an electro-optic modulator material used in, for example, a display or inspection of a flat panel display or the like. The technique may be briefly outlined as follows:

1. Provide a first transfer material;
2. Clean surface of first transfer material (optional);
3. Apply a fluid electro-optic modulator material on the first transfer material;
4. Cure electro-optic modulator material to define a relatively rigid electro-optic modulator structure;
5. Apply a second transfer material to the cured electro-optic modulator material;
6. Store the sandwiched electro-optic modulator material;
7. Peel off the second transfer material from the cured electro-optic modulator material to leave an exposed surface of cured-electro-optic modulator material;
8. Apply the exposed surface of the cured-electro-optic modulator material to a cleaned substrate having a first electrode layer thereon;
9. Allow electro-optic modulator material to bind to the cleaned substrate (preferably through use of an adhesive)
10. Remove first transfer material from layer of electro-optic material and keep the electro-optic material intact and affixed to the substrate;
11. Place a protective layer overlying the electro-optic modulator material;
12. Perform remaining fabrication steps as necessary.

As shown, the technique generally provides a sequence of steps that form an electro-optic modulator material using a transfer substrate. The transfer substrate is made using a novel sequence of steps including, at least, sandwiching the electro-optic material between two transfer sheets or materials. The technique removes one of these transfer sheets before affixing the often delicate electro-optic modulator material on a substrate or the like. These sequences of steps are merely illustrative and should not limit the scope of the claims herein. One of ordinary skill in the art would recognize other variations, modifications, and alternatives. Details of these steps are provided below with reference to the FIGS. below.

Figure 10:
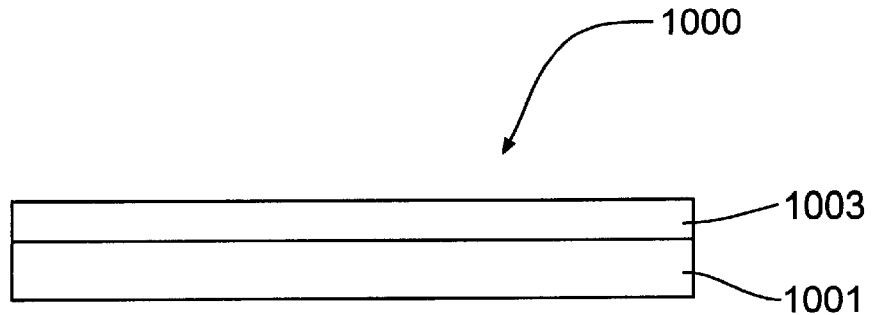

The method begins by way of a structure 1000 illustrated by FIG. 10, for example. The structure 1000 includes a transfer substrate (or sheet) 1001 having an overlying intermediate transfer sheet 1003 or film. The transfer substrate can be any relatively firm and rigid material capable of supporting the electro-optic modulator material. The substrate generally has a certain amount of flexibility, however. In most embodiments, the transfer substrate has a flexibility similar to a regular "business card." The substrate is also generally abrasion resistant and capable of protecting the electro-optic modulator material. An example of this transfer substrate is a film of plastic material, such as Mylar or the like, a metal, or a composite, but can also be others.

Overlying the transfer substrate is the intermediary transfer sheet 1003, which defines an interface between the transfer substrate 1001 and an electro-optic modulator material to be formed. This sheet has a relatively smooth surface finish to facilitate the transfer process. The sheet also should be durable and capable of temporarily adhering to an electro-optic modulator material, but can also easily detach itself from the electro-optic modulator material. An example of the intermediary sheet or film is a metal, such as indium tin oxide, but can also be other materials, e.g., plastics, composites, multi-film structures.

In other embodiments, the transfer substrate also includes the intermediary sheet or substrate in a single structure. That is, only a single transfer substrate structure is used. In these embodiments, the combination of the transfer and intermediary sheet(s) or substrate(s) may exhibit the same properties as the transfer substrate and the intermediary sheet individually. Of course, in other embodiments, additional films and/or layers can be added to facilitate the transfer process of the electro-optic modulator material.

Figure 11:
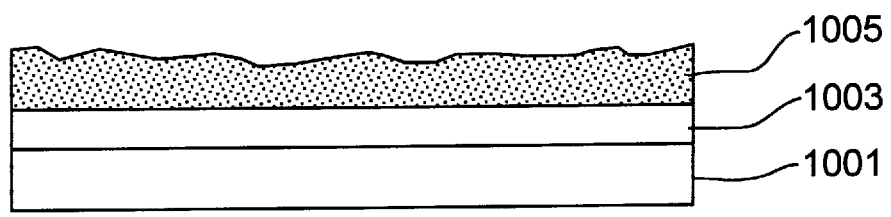

Liquid crystal emulsion 1005 is coated onto a surface of the intermediary substrate 1003 or transfer substrate, as shown by FIG. 11. In most embodiments, the emulsified liquid crystal material is a matrix which acts as a continuous spacer of the area over the transfer substrate. The liquid crystal material is coated onto the surface of the transfer substrate or intermediate substrate by way of an emulsified nematic liquid crystal in an aqueous mixture containing colloidal polymer particles. Mixing occurs to produce this emulsion which has a size distribution of liquid crystal droplets with a mean volume diameter in the range of about one to five microns, but can be others.

Figure 12:
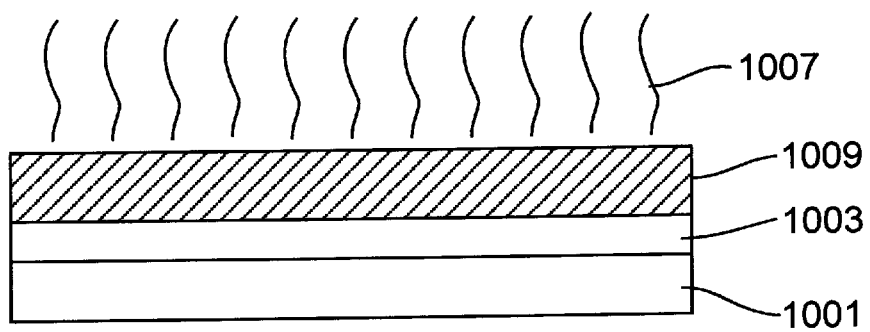

The liquid crystal emulsion cures 1007, as shown by FIG. 12. In particular, a drying process cures and removes moisture from the emulsified liquid crystal material. As the emulsion cures, it also firmly attaches to the underlying material, which can be the intermediary or transfer substrate. The attachment between the liquid crystal material, now the electro-optic modulator material, and the substrate is relatively permanent, but can be removed without substantially damaging the electro-optic modulator material itself.

The electro-optical modulator material has an upper exposed surface. This exposed surface is clean and substantially or completely free from contaminants, e.g., oils, particles. The exposed surface also is relatively planar and smooth. Planarity often ranges from a uniformity value of about 0 microns to about 3 microns across the surface, and is preferably less than about 4 microns RMS, but can also be others. The electro-optical modulator material is often made of liquid crystal containing sheets called Nematic Curvilinear Aligned Phase material, commonly termed NCAP or polymer dispersed liquid crystal (PDLC). Light transmission changes in accordance with a magnitude of an electric field impressed across the liquid crystal material. Alternatively, liquid crystals in a polymer matrix or binder which appear transparent or non-transparent may be used. Alternatively, materials that can be used exploiting the Pockel's effect, in which the magnitude of polarization of reflected light changes depend upon a strength of electric field applied or impressed thereon, may also be used. Of course, the type of electro-element or modulator material used depends upon the application.

Another transfer substrate 1008 (a second transfer substrate) is defined overlying the electro-optic modulator material 1009. This transfer substrate can be similar to transfer substrate 1001, but can also be different. Transfer substrate 1008 is affixed to the electro-optic modulator material 1009 by way of inherent attractive properties between transfer substrate 1008 and electro-optic modulator material 1009. That is, the electro-optic material has a certain "tackiness" or "stickiness" associated with it and with regard to its attraction towards the transfer substrate 1008 for the modulator material. Alternatively, an adhesive can be dispensed overlying transfer substrate 1008 or intermediary substrate 1012 to attach it to the electro-optic modulator material.

Preferably, the attachment (reference numeral 1) between the electro-optic modulator material 1009 and transfer substrate (1008 or intermediary substrate 1012) has a lower strength than the attachment (reference numeral 2) between the electro-optic modulator material 1009 and transfer substrate 1001 (or intermediary substrate 1003) to facilitate removal of transfer substrate 1008. In some embodiments, the strength of attachment (e.g., pressure, force) at reference numeral 1 is less than one-half of the strength of attachment at reference numeral 2. Alternatively, the strength of attachment (e.g., pressure, force) at reference numeral 1 is less than one-fifth of the strength of attachment at reference numeral 2. Alternatively, the strength of attachment (e.g., pressure, force) at reference numeral 1 is less than one-tenth of the strength of attachment at reference numeral 2. Alternatively, the strength of attachment (e.g., pressure, force) at reference numeral 1 is less than one-twentieth of the strength of attachment at reference numeral 2. Of course, depending upon the application the strength of attachment for either regions (reference numeral 1 or 2) can vary.

Before placing the transfer assembly onto a cube assembly, such as those described in this specification, the electro-optic modulator material need be exposed, which requires the transfer substrate 1007 and intermediary substrate 1012 to be removed. To facilitate removal of these substrates, the transfer and/or intermediary substrates have an overlying transfer substrate region(s) that extends or protrudes at least a distance ("α") 1015 outside the electro-optic modulator material in some embodiments. As shown, the intermediary substrate 1012 also has a region that extends or protrudes at least a distance ("α") outside the electro-optic modulator material in these embodiments.

The transfer substrate region extending outside of the electro-optic modulator material can, for example, be mechanically grasped and pulled as shown in FIG. 15. By way of pulling 1017 (refer to arrow) the region of the transfer substrate in a direction away from the modulator material, the transfer substrate is removed or effectively peeled off 1019 of the electro-optic modulator material, which removes the transfer substrate off of the electro-optic modulator material. As shown, the electro-optic modulator material remains firmly attached to transfer substrate 1001 and is not damaged by way of the transfer process. The electro-optic modulator material has an exposed surface which is essentially free from defects and is previously protected by the presence of the transfer substrate 1017. The electro-optic modulator material defined on transfer substrate 1001 can be applied to a variety of applications such as those described herein.

Although the FIGS. have been described in terms of both intermediary and transfer substrates, a single transfer substrate can be used. In other embodiments, the transfer substrate also includes the intermediary sheet or substrate in a single structure. That is, only a single transfer substrate structure is used. In these embodiments the combination of the transfer and intermediary sheet(s) or substrate(s) may exhibit the same properties as the transfer substrate and the intermediary sheet individually. Of course, in other embodiments, additional films and/or layers can be added to facilitate the transfer process of the electro-optic modulator material.

Additionally, the description above has been described in terms of manufacturing an electro-optic modulator assembly. It will be recognized, however, that the present electro-optic modulator can be used to repair defective modulator assemblies and the like. For instance, a modulator assembly having a defect may be removed and replaced by way of the present invention. Alternatively, defects which occur in the manufacture of the modulator material may be removed and replaced also. Accordingly, the present modulator material can be applied to a variety of other applications.

4. Present Modulator Repair Techniques

A method for repairing a modulator assembly may be briefly outlined as follows:

1. Provide a transfer material having a layer of electro-optic modulator material formed thereon;
2. Provide a defective electro-optic modulator assembly comprising a defect thereon;
3. Remove damaged electrode and electro-optic modulator materials from substrate;
4. Clean substrate to essential remove contamination therefrom;

5. Form first electrode layer on substrate (optional);
6. Clean surface of first electrode layer to remove any oils or particles therefrom;
7. Dispense adhesive material on the first electrode layer;
8. Place the layer of electro-optic modulator material (transfer material facing away from the substrate) on the first electrode layer overlying the substrate;
9. Allow adhesive to dry or cure;
10. Remove the transfer material from the layer of electro-optic material while keeping the electro-optic material intact and affixed to the first electrode layer;
11. Place a protective layer overlying the electro-optic modulator material; and
12. Perform remaining fabrication steps as necessary.

As shown, the technique generally provides a sequence of steps that replaces a defective electro-optic modulator material (and electrode) on a substrate. The sequence of steps uses an electro-optic modulator material formed on a transfer material, which is later disposed. By way of the transfer material, the electro-optic material is easy affixed to a substrate to form the electro-optic assembly, with a reduced possibility of damage to the electro-optic material or electrodes. The above sequence of steps is merely illustrative, and should not limit the scope of the claims herein. One of ordinary skill in the art would recognize other variations, modifications, and alternatives.

The invention has now been explained with reference to specific embodiments. Other embodiments will be apparent to those of ordinary skill in the art in light of the disclosure. It is therefore not intended that this invention be limited, except as indicated by the appended claims.

What is claimed is:

1. A method for fabricating an electro-optic modulator material, said method comprising:
   providing a first transfer substrate comprising a top surface;
   forming an electro-optic material onto said top surface of said first transfer substrate to attach said electro-optic material to said first transfer material, said forming step creating an exposed electro-optic material surface having a planarity that ranges between about 0 (zero) microns and about 4 (four) microns;
   forming a second transfer substrate overlying said exposed electro-optic material surface, said second transfer substrate being attached to said electro-optic material at lower strength than said attachment of said first transfer substrate to said electro-optic material;
   wherein said second transfer substrate has a larger surface area than said exposed electro-optic material surface to define a protruding region of said second transfer substrate that protrudes outside an edge of said electro-optic material; and
   applying a force to said protruding region to remove said second transfer substrate from said electro-optic material and leaving said electro-optic material substantially affixed to said first transfer material.

2. The method of claim 1 wherein said electro-optic material is selected from PDLC, NCAP.

3. The method of claim 1 wherein said electro-optic material is dispensed as a liquid onto said first transfer substrate and cured to firmly attach said first transfer substrate onto said electro-optic material.

4. The method of claim 1 wherein said first transfer substrate is a sheet of material.

5. The method of claim 1 wherein said second transfer substrate is a sheet of material.

6. The method of claim 1 wherein said first transfer substrate comprises a layer of indium tin oxide thereon.

7. The method of claim 1 wherein said first transfer substrate comprises a film selected from plastic, metal, and composites.

8. The method of claim 1 wherein said first transfer substrate comprises a Mylar film overlying a layer of indium tin oxide thereon.

9. The method of claim 1 wherein said lower strength is a relative force of about one-half or less.

10. The method of claim 1 wherein said lower strength is a relative force of about one-fifth and less.

11. The method of claim 1 wherein said lower strength is a relative force of about one-tenth and less.

12. The method of claim 1 wherein said lower strength is a relative force of about one-twentieth and less.

13. The method of claim 1 wherein said applying step is a peeling process.

14. A method of repairing an electro-optic element, said method comprising:
   providing an electro-optic assembly comprising a substrate, a first electro-optic modulator material defined on said substrate, and a first electrode overlying said modulator material, said electro-optic assembly having a defect thereon;
   removing said first electrode and said first modulator material from said substrate of said electro-optic assembly; and
   affixing a second electro-optic modulator material having an overlying transfer substrate.

15. The method of claim 14 further comprising a step of cleaning a surface of said substrate after said removing step.

16. The method of claim 14 further comprising a step of disposing a protective layer on said second electro-optic modulator material.

17. The method of claim 14 further comprising a step of removing said transfer substrate from said second electro-optic modulator material.

18. The method of claim 14 wherein said affixing step is provided by an adhesive applied between said second electro-optic modulator material and said substrate.

19. The method of claim 14 wherein said transfer substrate is a conductive layer.

20. The method of claim 14 wherein said defect is selected from a gouge, a scratch.

21. The method of claim 14 wherein said defect is provided in said first electro-optic modulator material.

22. The method of claim 14 wherein said defect is provided in said first electrode.

23. A method for fabricating an electro-optic modulator material, said method comprising:
   providing a first transfer substrate comprising a top surface;
   forming an electro-optic material onto said top surface of said first transfer substrate to attach said electro-optic material to said first transfer material, said electro-optic material having an exposed surface;
   forming a second transfer substrate overlying said exposed electro-optic material surface, said second transfer substrate being attached to said electro-optic material at lower strength than said attachment of said first transfer substrate to said electro-optic material;
   wherein said second transfer substrate has a larger surface area than said exposed electro-optic material surface to define a protruding region of said second transfer substrate that protrudes outside an edge of said electro-optic material;

applying a force to said protruding region to remove said second transfer substrate from said electro-optic material and leaving said electro-optic material substantially affixed to said first transfer material; and applying said electro-optic material using said first transfer substrate onto a substrate.

24. A method as in claim 23, wherein said exposed electro-optic material surface has a planarity that ranges between about 0 (zero) microns and about 4 (four) microns.

25. A method as in claim 23, further comprising cleaning at least one of said exposed electro-optic material surface and said substrate before applying said electro-optic material using said first transfer substrate onto said substrate.

26. A method as in claim 23, wherein said substrate further comprises an electrode, and said applying step comprises applying said electro-optic material to said electrode.

* * * * *